United States Patent [19]
Bourne et al.

[11] Patent Number: 5,664,433
[45] Date of Patent: Sep. 9, 1997

[54] INDIRECT AND DIRECT EVAPORATIVE COOLING SYSTEM

[75] Inventors: Richard C. Bourne, Davis, Calif.; Joel R. Johnson, Peoria, Ariz.

[73] Assignee: Davis Energy Group, Inc., Davis, Calif.

[21] Appl. No.: 570,008

[22] Filed: Dec. 14, 1995

[51] Int. Cl.$^6$ .................................................. F25D 5/00
[52] U.S. Cl. ........................ 62/314; 62/304; 261/DIG. 3
[58] Field of Search .............................. 62/304, 311, 314, 62/121; 261/158, DIG. 3

[56] References Cited

U.S. PATENT DOCUMENTS

| | | |
|---|---|---|
| D. 284,505 | 7/1986 | Bowman et al. . |
| 2,157,531 | 5/1939 | Fisher .................................... 62/314 |
| 2,321,687 | 10/1943 | Kucher . |
| 2,389,440 | 11/1945 | Kucher . |
| 2,817,217 | 12/1957 | Winkler et al. . |
| 3,214,936 | 11/1965 | DiPeri .................................... 62/314 |
| 4,380,910 | 4/1983 | Hood et al. ............................. 62/91 |
| 4,461,733 | 7/1984 | Otterbein . |
| 4,566,290 | 1/1986 | Otterbein . |
| 4,732,012 | 3/1988 | Thrope . |
| 5,050,391 | 9/1991 | Tsimerman ............................ 62/94 |
| 5,337,582 | 8/1994 | Santos ................................... 62/311 |
| 5,349,829 | 9/1994 | Tsimerman ............................ 62/314 |

OTHER PUBLICATIONS

Master Cool 2–Stage, Indirect Cooling Module (ICM) Use and Care Manual, pp. 1–8. This Manual is undated but is prior art.
Evaporative Air Conditioning Handbook, Chapter XXI, Modern Plate–Type Indirect Cooling, pp. 348–363; published 1986.

Primary Examiner—William Doerrler
Attorney, Agent, or Firm—Oliff & Berridge

[57] ABSTRACT

An indirect/direct evaporative cooling system for cooling air for comfort purposes includes a single, variable speed blower positioned below an indirect evaporative cooling stage and a direct evaporative cooling stage. A first portion of the blower discharge is directed horizontally through the indirect evaporative cooling stage, where it is cooled without the addition of moisture thereto, and is then further cooled in the direct evaporative stage prior to being supplied to a building. A second portion of the blower discharge is directed vertically through the indirect evaporative cooling stage and serves to cool the first portion as the first portion travels through the indirect stage. The indirect and direct cooling stages share a common sump for collecting water drained therefrom. The indirect stage includes a drip edge to keep drain water out of the flow of the first portion. A stud-straddle supply duct is attached to the direct cooling stage to facilitate installation of the system in wood-framed walls.

32 Claims, 6 Drawing Sheets

INDIRECT AND DIRECT EVAPORATIVE COOLING SYSTEM

BACKGROUND OF THE INVENTION

1. Field of the Invention

This invention relates to an improvement in indirect/direct evaporative cooling devices, and particularly to indirect/direct evaporative cooling devices used in conditioning air for comfort purposes.

2. Description of Related Art

Two stage evaporative coolers offer great promise for satisfying residential cooling loads at lower cost and with reduced environmental impacts compared to conventional air conditioning systems. Two stage coolers include an "indirect" stage and a "direct" stage and are also known as indirect/direct evaporative cooling (IDEC) units. IDEC units provide cooling with much less addition of moisture to the indoor space than direct evaporative coolers. In drier climates, most conventional (vapor-compression cycle) air conditioning systems use energy unnecessarily to remove moisture from indoor spaces.

In the first, i.e. indirect, stage of the IDEC unit, outdoor air is cooled without adding moisture. Indirect cooling is typically accomplished by passing the air through a first set of alternating passages in a system of parallel heat exchange plates. Simultaneously, a second airstream is passed through the second set of alternating passages. Water is supplied to the surfaces of the heat exchange plates that form the second set of passages. The second airstream contacts the wet heat exchange plates and evaporatively cools the plates. The first airstream is cooled by contact with the surfaces of the cooled plate. The cooled first airstream exits the indirect evaporative cooling stage and is then further evaporatively cooled by direct contact with a wet medium in the direct evaporative cooling stage. The first airstream exits the direct cooling stage where it is then supplied to the interior of a building. While it is theoretically possible to cool the supply air completely by an indirect process, the cost of larger plates and greater "wet passage" air quantities limits the potential cost-effectiveness of "indirect-only" coolers.

Several IDEC systems are currently available for commercial building applications. Only one, the "MasterCool 2 Stage" unit produced by AdobeAir of Phoenix, Ariz., is currently marketed for residential applications. "MasterCool 2 Stage" units have been successfully used in many homes. Extensive monitoring data and occupant responses testify to the effective performance of these units. However, these units are somewhat larger than conventional cooling systems. Consequently, the potential for retrofit installations is limited.

In addition, the on/off operation of the blowers of the conventional IDEC systems produces noticeable noise during operation. Consequently, the user is always aware of unit operation.

Moreover, the conventional IDEC systems have the indirect and direct stages formed as independent units that are connected together to form the IDEC unit. Such an arrangement leads to redundancies in the components of the indirect and direct cooling stages. For example, the conventional IDEC systems have separate pumps and blowers for each of the cooling stages. Consequently, such systems are large and expensive.

In addition, the sump of conventional IDEC systems is conducive to bacterial growth which can lead to odors and possible health hazards, because the conventional sump maintains a constant water level. Bacterial growth is fostered by permitting the water to remain in the sump for an extended period of time, particularly during warm weather.

Further, in order to supply the cooled air from the IDEC unit through an exterior wall of the building, it is frequently necessary to modify the wood framing arrangement of the wall. As a result, installation costs are significantly increased.

For these reasons, there exists a need for an indirect/direct evaporative cooling unit that is compact and can be easily retrofitted to existing residences. In addition, there exists a need for an indirect/direct evaporative cooling unit that minimizes awareness of unit operation. There also exists a need for an indirect/direct evaporative cooling unit that can be easily fabricated with a minimum number of components.

SUMMARY OF THE INVENTION

The present invention is directed to an indirect/direct evaporative cooling unit that satisfies these needs. An indirect/direct evaporative cooling unit having features of the present invention includes an indirect evaporative cooling stage, a direct evaporative cooling stage positioned downstream with respect to the indirect evaporative cooling stage, and a vertically discharging blower positioned upstream with respect to the indirect evaporative cooling stage. The indirect evaporative cooling stage has a substantially horizontally extending first flow passage and a substantially vertically extending second flow passage. With this arrangement, the indirect/direct evaporative cooling unit has a compact footprint. As a result, retrofit installation in existing residences is facilitated.

In accordance with another embodiment of the invention, the indirect/direct evaporative cooling unit uses a single blower. With this arrangement, the overall size and cost of the cooling unit is reduced since the use of separate blowers for the indirect and direct cooling stages is eliminated.

In accordance with another embodiment of the invention, the blower is a variable speed blower. With this arrangement, the blower can gradually increase and decrease speeds. As a result, awareness of unit operation is minimized, and average energy efficiency is improved since the blower can be driven at the lowest speed required by the current cooling load.

In accordance with another embodiment of the invention, a common sump and pump for water collection and recirculation is provided for both the direct and indirect evaporative cooling stages. With this arrangement, the indirect/direct evaporative cooling unit can be made more compact, manufacturing is simplified, and cost is reduced.

In accordance with a still further embodiment of the invention, the sump of the indirect/direct evaporative cooling unit is provided with a controlled dump valve to regularly and completely drain the sump water. Accordingly, bacterial growth can be inhibited.

In accordance with another embodiment, the sump is further provided with sloped walls to ensure complete drainage of the water contained in the sump.

In accordance with another embodiment of the invention, the indirect/direct evaporative cooling unit is provided with a stud-straddle supply duct. With this arrangement, modification of the existing wall stud arrangement is eliminated.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

A preferred embodiment of the present invention is described hereafter, with reference to the drawings.

Figure 1:
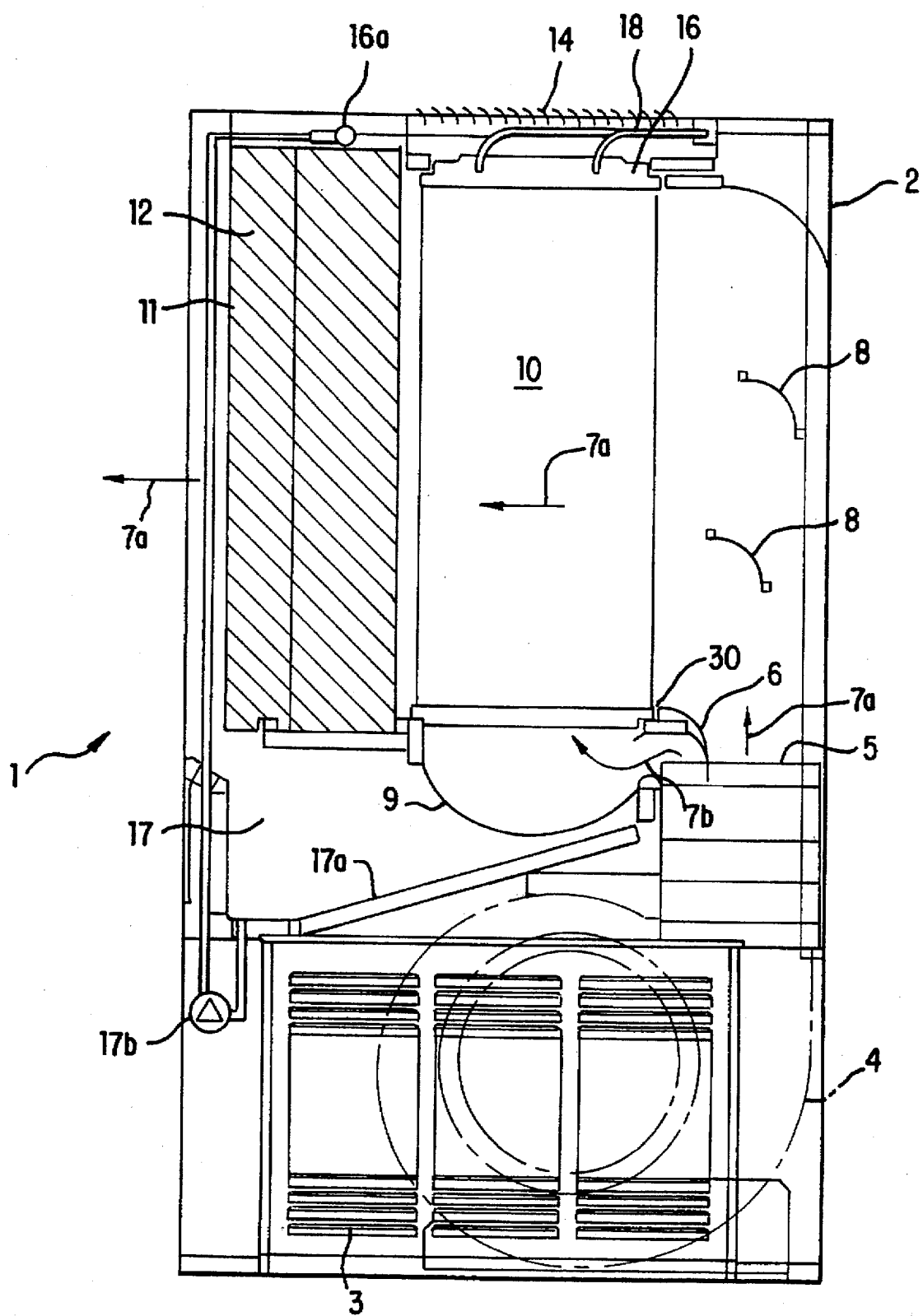
FIG. 1 is a side cross-sectional view of the indirect/direct evaporative cooling unit according to an embodiment of the present invention.

FIG. 1 is a side cross-sectional view of the indirect/direct evaporative cooling (IDEC) unit according to an embodiment of the present invention.

The IDEC unit 1 includes a housing 2. Louvers 3, formed in both sides of the housing 2, permit communication between an intake of a blower 4 and outside air. The blower 4 operates at variable speeds and may include, for example, an impeller wheel operably connected to a variable speed motor. The variable speed operation of the blower improves average energy efficiency of the IDEC unit by operating at the lowest speed required by the current cooling load. The blower is driven by an electronically commutated motor (ECM) having an efficient operation throughout a wide range of speeds so as to gradually increase and decrease speed. The gradual changes in the speed of the blower minimize awareness of unit operation.

The air is discharged by the blower vertically through an outlet 5 of the blower. A portion 7b of the air flow is diverted from a first air flow 7a by a diverter 6. First air flow 7a, which will eventually be supplied to the interior of the building, is first redirected to flow horizontally by turning vanes 8. The redirected first air flow 7a then enters an indirect evaporative cooling stage 10, where it is cooled without the addition of moisture thereto (to be later described). The cooled first air flow 7a leaves the indirect cooling stage and enters the direct cooling stage 11, where it is further evaporatively cooled prior to being supplied to the interior of the building.

The second air flow 7b, which serves to cool the first air flow (as described later), is directed to the bottom of the indirect cooling stage 10 by a perforated baffle 9. The second air flow 7b enters the bottom of the indirect cooling stage, flows vertically through the indirect cooling stage, and then exits through a grill 14 into the atmosphere.

A sump 17 is positioned beneath both the direct and indirect cooling stages to catch drain water from these cooling stages. The sump 17 has a sloping wall 17a to facilitate water drainage. A pump 17b having an inlet connected to the floor of the sump 17 is provided to pump the accumulated drain water to an indirect stage top tray 16 and a direct stage feed tube 16a. From the top tray 16, water is conveyed by felt strips rub 18 downward into the top portion of the indirect cooling stage wet passages.

Figure 2:
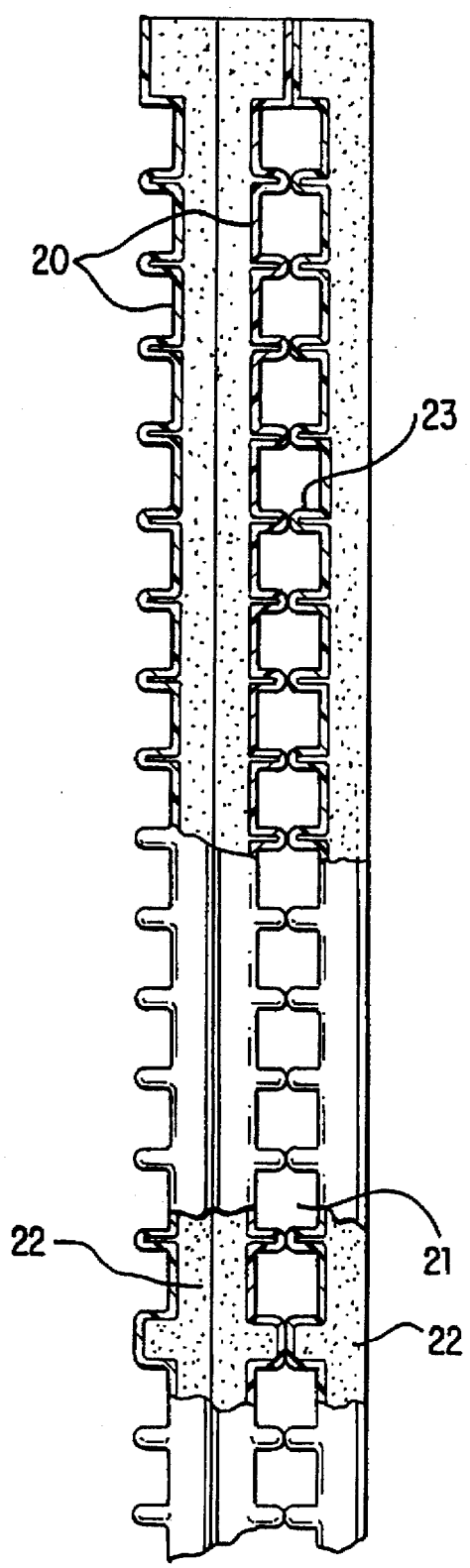
FIG. 2 is a partial cross-sectional view of the heat exchange plate arrangement of the indirect cooling stage shown in FIG. 1.

FIG. 2 is a partial cross-sectional view of the heat exchange plate arrangement of the indirect cooling stage 10 shown in FIG. 1. The indirect cooling stage 10 uses parallel heat exchange plates 20. The plate designed is substantially as shown in U.S. Pat. Nos. 4,461,733 and 4,566,290, the disclosures of which are hereby incorporated by reference. As shown in FIG. 2, the indirect cooling stage is divided into a first set of passages 21 for first air flow 7a, and a second set of passages 22 for second air flow 7b. Passages 22 are treated to enhance wettability. Water, conveyed by siphoning action through tubes 18, enters the second set of passages 22 and wets the surfaces of the heat exchange plates. Second air flow 7b flows through the second set of passages 22 and evaporatively cools the heat exchange plates 20. Meanwhile, the first air flow 7a, traveling through the first set of passages 21, is cooled by contact with the surfaces of the cooled heat exchange plates. In this manner, the first air flow is cooled without the addition of any moisture thereto.

The cooled first air flow 7a leaves the indirect cooling stage and is further cooled in the direct cooling stage 11 in a known manner. The direct evaporative cooling stage 11 includes an evaporative medium 12 (FIG. 1) which includes, for example, a wetted pad or permeable medium, to evaporatively cool the first air flow 7a. A suitable high quality evaporative medium is "CELDEC," available from Munters Corporation.

Figure 3:
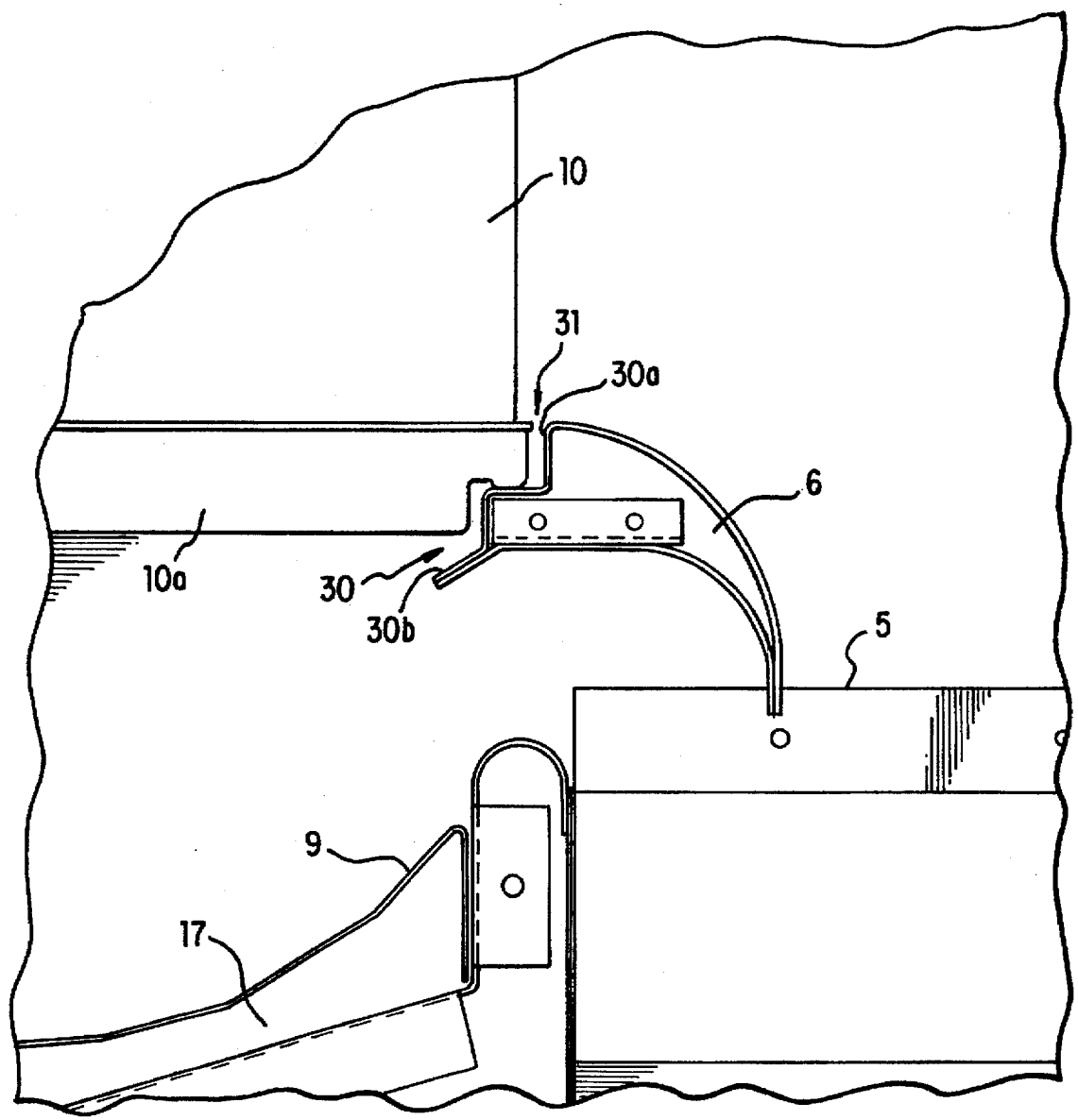
FIG. 3 is an enlarged, side cross-sectional view of a drip edge shown in FIG. 1.

As shown in FIG. 3, one end of the bottom portion 10a of the indirect evaporative cooling stage 10 rests on a linear drip edge 30. Any indirect stage drain water that escapes from the indirect cooling stage 10 due to, for example, turbulence, will enter passage 31 formed by the upper end of the bottom portion 10a and the upper portion 30a of drip edge 30. The drain water is directed to the sump 17 through the perforations of baffle 9 by the bottom portion 30b of the drip edge 30.

With the above arrangement, any drain water that escapes from the indirect cooling stage 11 is kept out of the first air stream 7a and the blower 4. Further, the perforated baffle 9 smooths the entry of second airflow 7b into the vertical passages of indirect stage 11 while permitting drain water to pass therethrough.

Figure 4:
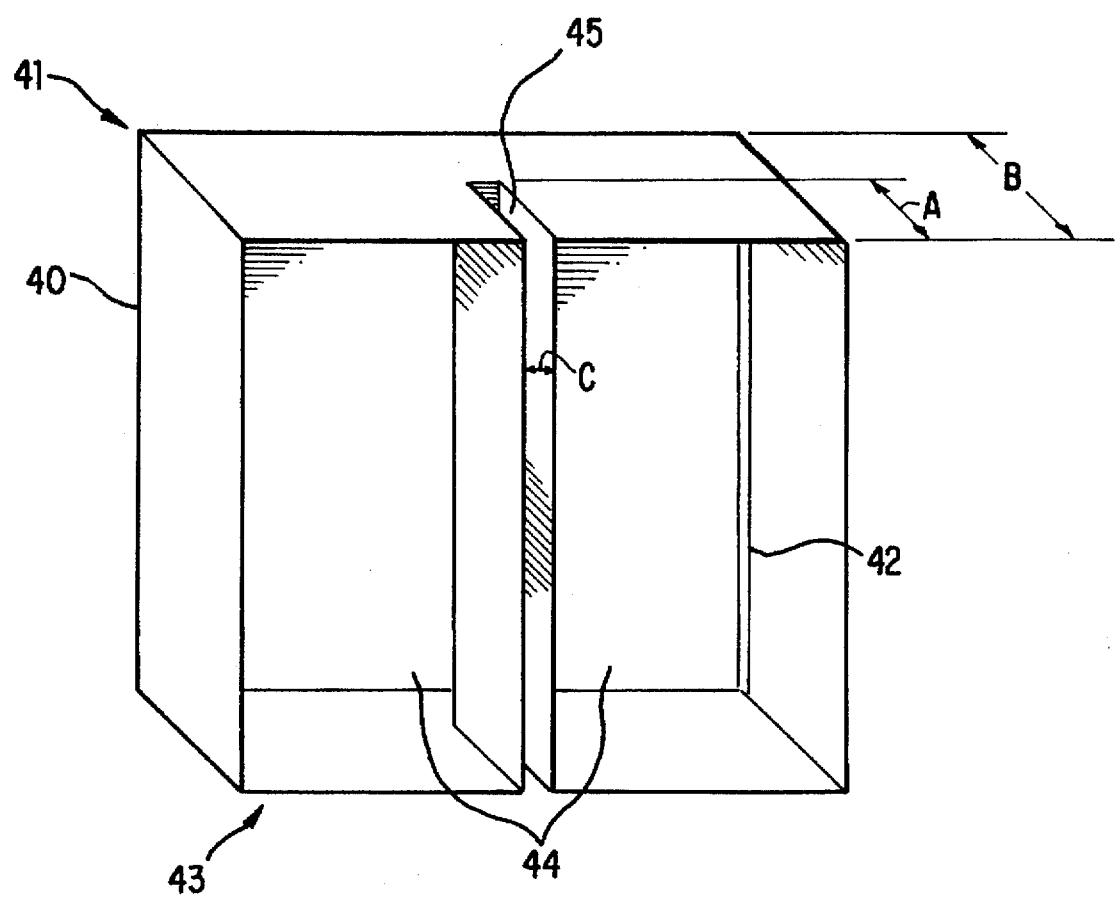
FIG. 4 is a perspective view of a stud-straddle supply duct for use with the indirect/direct evaporative cooling unit of FIG. 1.

FIG. 4 is a perspective view of a stud-straddle supply duct 40 for use with the IDEC unit 1 of FIG. 1 The rear portion 41 is connected to the IDEC unit 1 by a rolled edge 42 cooperatively engaging a corresponding mating portion on the IDEC unit (not shown). A front portion 43 includes two supply air outlets 44 for discharging the cooled air into the building. The outlets 44 are separated from each other by a channel 45, which is sized to receive a wall stud (not shown) in the exterior wall of the building. Typically, the wall studs are either 2"×4" or 2"×6" lumber spaced on 16" centers. When 2"×4" studs are used, distances A and B preferably equal about 4" and 7", respectively. When 2"×6" studs are used, A and B preferably equal about 6" and 9", respectively. C preferably equals about 1" with both stud sizes. With the above arrangement, modification of the existing wall stud arrangement is eliminated. It is understood, of course, that other dimensions are possible. Such other dimensions are limited only by the object of eliminating the need to modify the existing stud arrangement of the wall. A single grille may be used on the interior side to cover the two outlets and to direct air flow as desired.

Figure 5:
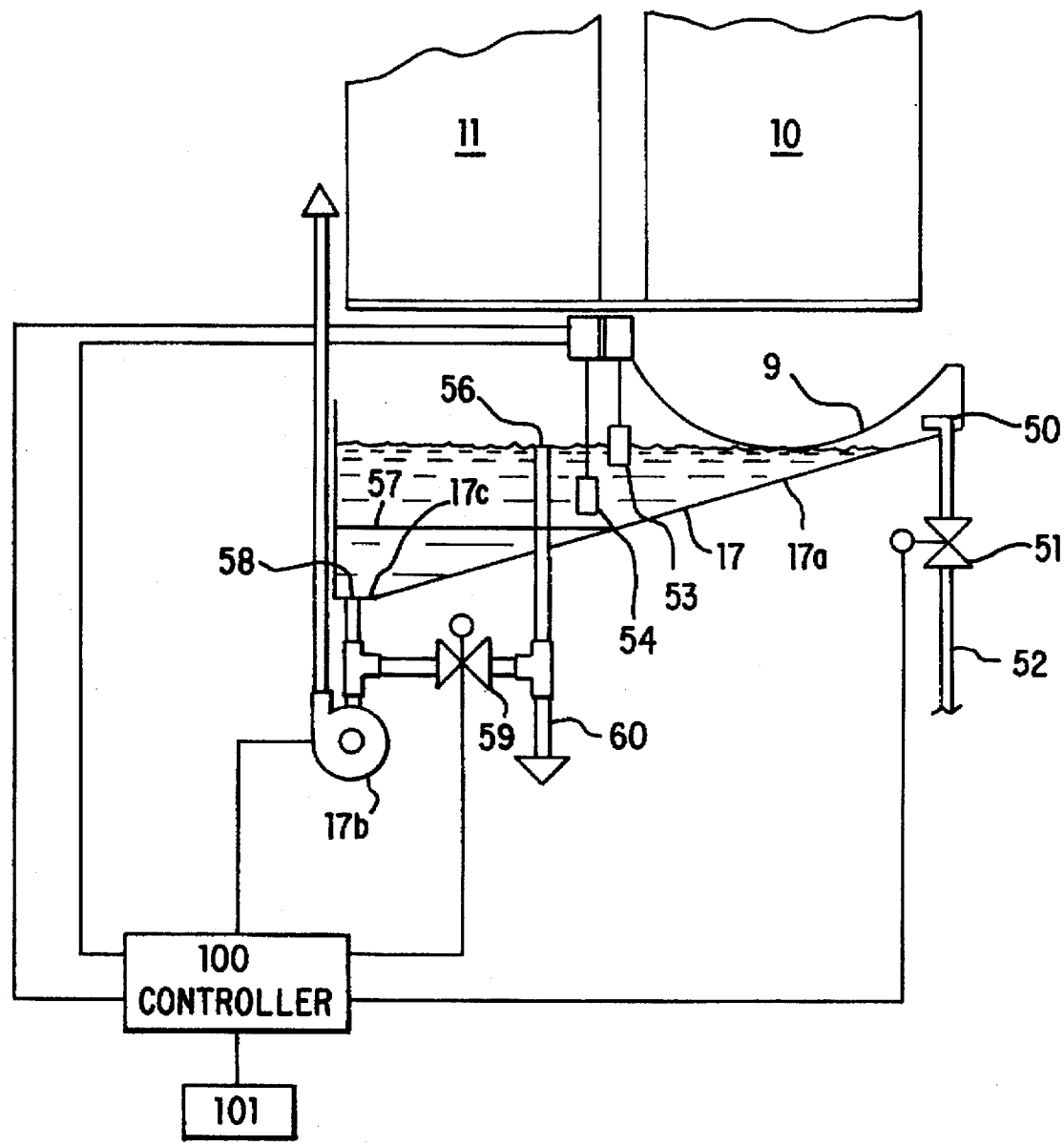
FIG. 5 is a schematic diagram of a sump arrangement according to another embodiment of the invention.

FIG. 5 illustrates an alternative sump arrangement for use with the IDEC unit. This embodiment is designed to prevent continuous standing water in the sump and thus prevent bacterial growth in the sump.

In FIG. 5, sump 17 has a long sloping side 17a and a narrow bottom 17c which also slopes toward a combined drain and pump suction port 58. When the sump is dry and operation of the IDEC unit is anticipated by the system controller 100, a motorized drain valve 59 is closed and a motorized fill valve 51 is opened by the controller to allow water from a pressurized supply 52 to enter the sump pan through a fill port 50. Fill port 50 is located higher than an overflow port 56 connected to drain pipe 60. By providing the overflow port, even if the fill function should malfunction (for example, by valve fill 51 sticking in the open position), the sump will not overfill or allow backflow through supply port 50 to contaminate the public water supply. Filling continues until a float 53 is sufficiently lifted by the rising water level so as to signal the fill valve 51 to close. A second float 54 is provided to protect pump 17b from running dry.

When the system thermostat 101 indicates a cooling load, pump 17b is started only when float 54, which is located at a level lower than float 53, is raised to a predetermined position by the water in the sump. Blower 4 (FIG. 1) begins operation a short time later, i.e., after a period of time that is sufficient to allow pump 17b to suitably wet the evaporative media has elapsed. Pump 17b draws sump water from port 58 through a screen 57 provided to prevent debris from entering the port. When the cooling cycle terminates, the pump and blower are deactivated and drain water returns to the sump.

When the system has been off for an extended period of time, e.g., three hours, as measured by the system controller 100, the motorized drain valve 59 is automatically opened and the water in the sump is completely drained through drain pipe 60. During drainage, the float 53 will fall below its predetermined water fill signalling height. Therefore, in order to permit the sump to dry, fill valve 51 is controlled so as to remain closed regardless of the position of float 53 during drainage. The fill valve 51 remains closed until the system thermostat signals a cooling load.

With the above arrangement, since the water in the sump is regularly and completely drained, bacterial growth in the sump is prevented.

Further, removal of the sump water facilitates drying of the evaporative media which in turn impedes bacterial growth on the media, because removal of the sump water reduces the humidity inside the IDEC unit. In typical dry climate conditions, the evaporative media will completely dry at least once per day using the embodiment of FIG. 5.

Figure 6:
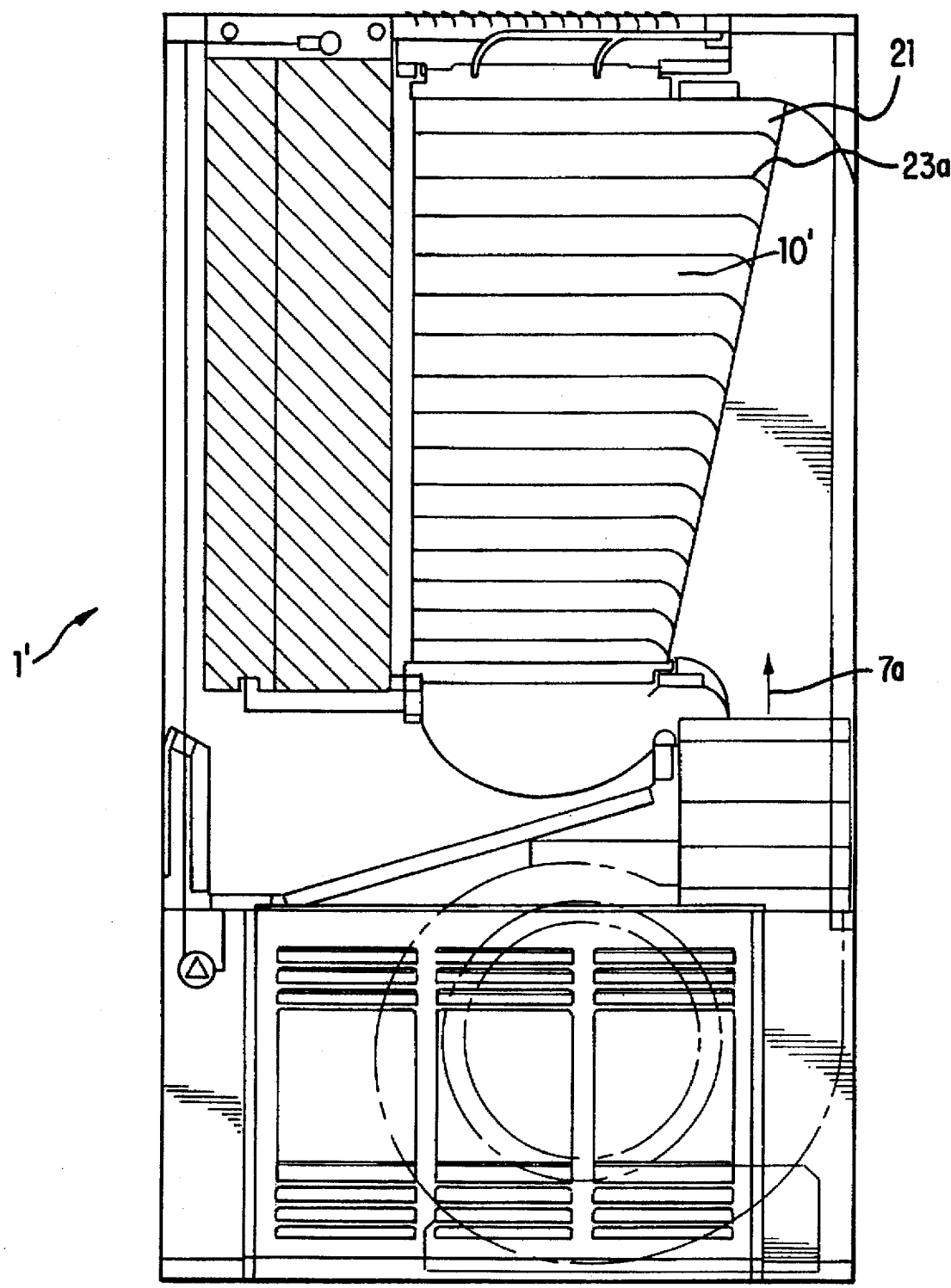
FIG. 6 is a side cross-sectional view of an indirect/direct evaporating cooling unit using an alternative heat exchange plate arrangement.

FIG. 6 illustrates an IDEC unit 1' which uses an alternative heat exchange plate arrangement for the indirect cooling stage 10' than that of the previously described embodiment of FIG. 1. In the embodiment of FIG. 6, the horizontally extending passages 21 of the heat exchange plates have lengths that increase in the vertical direction so as to form a heat exchange plate assembly having a substantially trapezoidal cross-section. The horizontal walls of the passages 21 formed by the fins 23 (FIG. 2) have downwardly curved portions 23a that redirect the vertical primary flow 7a to the horizontal direction. Thus, the downwardly curved portions 23a perform the same function as the previously described turning vanes 8. The downwardly curved portions 23a are molded onto the heat exchange plates as a one-piece unit.

With this arrangement, the separately formed and assembled turning vanes 8 of the first described embodiment are not needed. Consequently, assembly is simplified and cost is reduced. Further, the trapezoidal configuration of the indirect cooling stage results in a smaller footprint than that of the first embodiment, by eliminating the extra space required for turning vanes 8. Consequently, the dimension of the IDEC along the horizontal flow direction may be reduced.

Although the invention has been shown and described with respect to preferred embodiments thereof, it should be understood by those skilled in the art that various changes and omissions in the form and detail thereof may be made therein without departing from the spirit and scope of the invention as defined in the appended claims.

What is claimed is:

1. An indirect and direct evaporative cooler comprising:
   a direct evaporative cooling stage;
   an indirect evaporative cooling stage positioned upstream with respect to the direct evaporative cooling stage, the indirect evaporative cooling stage having a substantially horizontally extending primary flow passage and a substantially vertically extending secondary flow passage; and
   a blower positioned upstream with respect to the indirect evaporative cooling stage, wherein the blower discharges air in a vertical direction, a portion of the air being turned 90° to flow horizontally through the primary flow passage.

2. The device of claim 1, wherein the blower is positioned below at least one of the cooling stages.

3. The device of claim 1, further comprising means for separating the air discharged by the blower into first and second air flows.

4. The device of claim 3, wherein the separating means comprises a diverter positioned proximate to an outlet of the blower.

5. The device of claim 3, wherein one of the first and second air flows enters through the bottom of the indirect cooling stage.

6. The device of claim 1, further comprising a drip edge for keeping water from said indirect cooling stage out of the first flow.

7. The device of claim 1, further comprising means for directing at least a portion of air discharged by the blower into the substantially horizontally extending flow path of the indirect evaporative cooling stage.

8. The device of claim 7, wherein the indirect cooling stage comprises a heat exchange plate arrangement, and the directing means comprises turning vanes integral with said heat exchange plate arrangement.

9. The device of claim 8, wherein the heat exchange plate arrangement and the turning vanes are plastic.

10. The device of claim 8, wherein at least a portion of the turning vanes and at least a portion of the heat exchange plate assembly are together formed as a one-piece unit.

11. The device of claim 1, wherein the blower is a variable speed blower.

12. The device of claim 11, wherein the blower gradually changes speeds.

13. The device of claim 1, further comprising a common sump and pump shared by the direct and indirect cooling stages.

14. The device of claim 13, wherein the sump has a drain valve.

15. The device of claim 14, further comprising a controller for controlling the drain valve to regularly drain the sump.

16. The device of claim 13, wherein the sump has at least one sloping side and is configured to fully drain.

17. The device of claim 1, further comprising a supply duct including a channel for receiving a wall stud.

18. The device of claim 17, wherein the channel separates a plurality of air outlets of the duct.

19. The device of claim 1, further comprising a shared sump positioned beneath said indirect and direct cooling stages; a perforated baffle position approximate to said sump.

20. An indirect and direct evaporative cooler comprising:

a direct evaporative cooling stage;

an indirect evaporative cooling stage positioned upstream with respect to the direct evaporative cooling stage, the indirect evaporative cooling stage having a substantially horizontally extending primary flow passage and a substantially vertically extending secondary flow passage;

a shared sump positioned beneath said indirect and direct cooling stages;

a drain valve connected to said sump; and a thermostatically activated controller connected to said drain valve.

21. An indirect and direct evaporative cooler comprising:

a direct evaporative cooling stage;

an indirect evaporative cooling stage positioned upstream with respect to the direct evaporative cooling stage, the indirect evaporative cooling stage having a substantially horizontally extending primary flow passage and a substantially vertically extending secondary flow passage; and a blower positioned upstream with respect to the indirect evaporative cooling stage and below at least one of the cooling stages, wherein the blower discharges air in a vertical direction.

22. An indirect and direct evaporative cooler comprising:

a direct evaporative cooling stage;

an indirect evaporative cooling stage positioned upstream with respect to the direct evaporative cooling stage, the indirect evaporative cooling stage having a substantially horizontally extending primary flow passage and a substantially vertically extending secondary flow passage;

a blower positioned upstream with respect to the indirect evaporative cooling stage, wherein the blower discharges air in a vertical direction; and means for separating the air discharged by the blower into first and second air flows, wherein one of the first and second air flows enters through the bottom of the indirect cooling stage.

23. An indirect and direct evaporative cooler comprising:

a direct evaporative cooling stage;

an indirect evaporative cooling stage positioned upstream with respect to the direct evaporative cooling stage, the indirect evaporative cooling stage having a substantially horizontally extending primary flow passage and a substantially vertically extending secondary flow passage;

a blower positioned upstream with respect to the indirect evaporative cooling stage, wherein the blower discharges air in a vertical direction; and a drip edge for keeping water from said indirect cooling stage out of the first flow.

24. An indirect and direct evaporative cooler comprising:

a direct evaporative cooling stage;

an indirect evaporative cooling stage positioned upstream with respect to the direct evaporative cooling stage, the indirect evaporative cooling stage comprising a heat exchange plate arrangement and having a substantially horizontally extending primary flow passage and a substantially vertically extending secondary flow passage;

a blower positioned upstream with respect to the indirect evaporative cooling stage, wherein the blower discharges air in a vertical direction; and means for directing at least a portion of air discharged by the blower into the substantially horizontally extending flow path of the indirect evaporative cooling stage, wherein the directing means comprises a plurality of turning vanes formed integrally with the heat exchange plate arrangement.

25. The device of claim 24, wherein the heat exchange plate arrangement and the turning vanes are plastic.

26. The device of claim 24, wherein at least a portion of the turning vanes and at least a portion of the heat exchange plate assembly are together formed as a one-piece unit.

27. An indirect and direct evaporative cooler comprising:

a direct evaporative cooling stage;

an indirect evaporative cooling stage positioned upstream with respect to the direct evaporative cooling stage, the indirect evaporative cooling stage having a substantially horizontally extending primary flow passage and a substantially vertically extending secondary flow passage; and a variable speed blower positioned upstream with respect to the indirect evaporative cooling stage, wherein the blower discharges air in a vertical direction.

28. The device of claim 27, wherein the blower gradually changes speeds.

29. An indirect and direct evaporative cooler comprising:

a direct evaporative cooling stage;

an indirect evaporative cooling stage positioned upstream with respect to the direct evaporative cooling stage, the indirect evaporative cooling stage having a substantially horizontally extending primary flow passage and a substantially vertically extending secondary flow passage;

a blower positioned upstream with respect to the indirect evaporative cooling stage, wherein the blower discharges air in a vertical direction; and a sump and a pump shared by the direct and indirect cooling stages, wherein the sump has a drain value and has at least one sloping side and is configured to fully drain.

30. An indirect and direct evaporative cooler comprising:

a direct evaporative cooling stage;

an indirect evaporative cooling stage positioned upstream with respect to the direct evaporative cooling stage, the indirect evaporative cooling stage having a substantially horizontally extending primary flow passage and a substantially vertically extending secondary flow passage;

a blower positioned upstream with respect to the indirect evaporative cooling stage, wherein the blower discharges air in a vertical direction; and a supply duct including a channel for receiving a wall stud.

31. The device of claim 30, wherein the channel separates a plurality of air outlets of the duct.

32. An indirect and direct evaporative cooler comprising:

a direct evaporative cooling stage;

an indirect evaporative cooling stage positioned upstream with respect to the direct evaporative cooling stage, the indirect evaporative cooling stage having a substantially horizontally extending primary flow passage and a substantially vertically extending secondary flow passage;

a blower positioned upstream with respect to the indirect evaporative cooling stage, wherein the blower discharges air in a vertical direction;

a shared sump positioned beneath said indirect and direct cooling stages; and a perforated baffle positioned proximate to said sump.

* * * * *